(12) United States Patent
Lee et al.

(10) Patent No.: US 10,682,896 B2
(45) Date of Patent: Jun. 16, 2020

(54) SYSTEM AND METHOD OF CONTROLLING ENGINE FOR VEHICLE INTERIOR HEATING

(71) Applicants: Hyundai Motor Company, Seoul (KR); Kia Motors Corporation, Seoul (KR)

(72) Inventors: Myung Seok Lee, Gyeonggi-do (KR); Jea Mun Lee, Seoul (KR); Jung Soo Park, Seoul (KR); Hong Kee Sim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 537 days.

(21) Appl. No.: 15/364,908

(22) Filed: Nov. 30, 2016

(65) Prior Publication Data

US 2017/0341487 A1    Nov. 30, 2017

(30) Foreign Application Priority Data

May 26, 2016 (KR) .......................... 10-2016-0064577

(51) Int. Cl.
   *B60H 1/04* (2006.01)
   *F01P 3/20* (2006.01)
   (Continued)

(52) U.S. Cl.
   CPC .............. *B60H 1/04* (2013.01); *B60H 1/004* (2013.01); *B60W 10/30* (2013.01); *F01P 3/20* (2013.01);
   (Continued)

(58) Field of Classification Search
   CPC .... B60K 41/02; B60K 41/022; B60K 41/025; B60K 41/027; B60K 41/284;
   (Continued)

(56) References Cited

U.S. PATENT DOCUMENTS 2,924,209 A * 2/1960 Schott ................. F02N 11/0811
                                                    123/179.3
3,483,853 A * 12/1969 Fricker ................... F02B 67/08
                                                     123/198 R (Continued)

FOREIGN PATENT DOCUMENTS

JP          2013-108812      6/2013
KR          10-1338463       12/2013
(Continued)

*Primary Examiner* — Sizo Vilakazi
*Assistant Examiner* — Kevin R Steckbauer
(74) *Attorney, Agent, or Firm* — Mintz Levin Cohn Ferris Glovsky and Popeo, P.C.; Peter F. Corless

(57) ABSTRACT

A method and system of controlling an engine for vehicle interior heating is provided. The method includes performing a first engine control when the engine is not in an engine-on state for vehicle driving, to perform heating control for interior heating at a predetermined range of a reference coolant temperature. Additionally, the method includes performing a second engine control when the engine is in an engine-on state for vehicle driving, to prolong an engine-on time for vehicle driving by setting a minimum value of the range of the reference coolant temperature to a lower value and setting a maximum value of the range of the reference coolant temperature to a higher value and to determine a point of time of engine-off operation based on a real-time lock up time and an average lock up time of an engine clutch for vehicle driving.

10 Claims, 4 Drawing Sheets

(51) Int. Cl.
*B60H 1/00* (2006.01)
*B60W 10/30* (2006.01)
*F02N 11/08* (2006.01)
*B60W 50/00* (2006.01)

(52) U.S. Cl.
CPC ... *F02N 11/0829* (2013.01); *B60W 2050/004* (2013.01); *B60W 2510/02* (2013.01); *B60W 2510/0208* (2013.01); *B60W 2710/02* (2013.01); *B60W 2710/021* (2013.01); *F01P 2037/00* (2013.01); *F01P 2060/08* (2013.01); *F02D 2200/021* (2013.01); *F02N 2200/023* (2013.01); *F02N 2200/0801* (2013.01)

(58) Field of Classification Search
CPC ....... B60W 2050/004; B60W 2510/02; B60W 2510/0208; B60W 2510/0216; B60W 2510/0225; B60W 2510/0676; B60W 2710/02; B60W 2710/021; B60W 2710/022; B60W 2710/023; B60W 2710/0688; B60W 20/00; B60W 20/15
See application file for complete search history.

(56) References Cited

U.S. PATENT DOCUMENTS

| | | | | |
|---|---|---|---|---|
| 5,140,826 A * | 8/1992 | Hanson | ............. | B60H 1/00014 123/142.5 R |
| 5,345,761 A * | 9/1994 | King | ............. | B60L 1/12 180/65.245 |
| 7,003,395 B1 * | 2/2006 | Thompson | ............. | F02N 11/0803 701/113 |
| 7,036,477 B1 * | 5/2006 | Thompson | ............. | F02D 17/04 123/179.4 |
| 7,146,959 B2 * | 12/2006 | Thompson | ............. | F02N 11/0803 123/179.4 |
| 7,217,223 B2 * | 5/2007 | Saeki | ............. | B60K 6/44 477/166 |
| 7,454,910 B2 * | 11/2008 | Hamada | ............. | F01K 23/065 60/618 |
| 8,346,422 B2 * | 1/2013 | Chen | ............. | B60W 10/06 180/65.1 |
| 8,489,267 B1 * | 7/2013 | Lombardo | ............. | B60H 1/00385 123/299 |
| 8,512,207 B2 * | 8/2013 | Stoner | ............. | B60K 6/12 475/83 |
| 8,727,945 B2 * | 5/2014 | Stoner | ............. | B60K 6/12 477/175 |
| 9,156,332 B2 * | 10/2015 | Yasui | ............. | B60W 20/15 |
| 9,163,603 B2 * | 10/2015 | Wakou | ............. | B60H 1/00778 |
| 9,688,277 B2 * | 6/2017 | Furuya | ............. | B60W 10/02 |
| 9,702,315 B1 * | 7/2017 | Palmer | ............. | F02D 43/00 |
| 9,726,137 B2 * | 8/2017 | Ohno | ............. | B60W 20/40 |
| 9,758,171 B2 * | 9/2017 | Martini | ............. | B60W 10/30 |
| 2005/0144949 A1 * | 7/2005 | Hamada | ............. | F01K 23/065 60/670 |
| 2006/0137643 A1 * | 6/2006 | Thompson | ............. | F02N 11/0803 123/179.4 |
| 2008/0110189 A1 * | 5/2008 | Alston | ............. | B60H 1/00428 62/236 |
| 2008/0270010 A1 * | 10/2008 | Harumoto | ............. | F02D 41/022 701/110 |
| 2011/0067420 A1 * | 3/2011 | Alston | ............. | B60H 1/00428 62/133 |
| 2011/0114405 A1 * | 5/2011 | Perhats | ............. | B60H 1/14 180/68.1 |
| 2011/0203891 A1 * | 8/2011 | Stoner | ............. | B60K 6/12 192/3.21 |
| 2011/0288701 A1 * | 11/2011 | Chen | ............. | B60W 10/06 701/22 |
| 2013/0030679 A1 * | 1/2013 | Wakou | ............. | B60H 1/00778 701/113 |
| 2013/0303331 A1 * | 11/2013 | Stoner | ............. | B60K 6/12 477/62 |
| 2014/0110489 A1 * | 4/2014 | Yasui | ............. | F02N 11/0833 237/5 |
| 2014/0149024 A1 * | 5/2014 | Kim | ............. | B60W 10/02 701/112 |
| 2015/0183435 A1 * | 7/2015 | Johnson | ............. | F02N 19/10 701/112 |
| 2015/0330351 A1 * | 11/2015 | Ragazzi | ............. | F02M 31/16 123/552 |
| 2016/0016455 A1 * | 1/2016 | Miyagawa | ............. | B60H 1/00742 62/133 |
| 2016/0097365 A1 * | 4/2016 | Ohno | ............. | B60W 20/40 123/179.3 |

FOREIGN PATENT DOCUMENTS

KR  10-2015-0076328  7/2015
KR  10-2015-0146173  12/2015

* cited by examiner

SYSTEM AND METHOD OF CONTROLLING ENGINE FOR VEHICLE INTERIOR HEATING

CROSS-REFERENCE TO RELATED APPLICATION

This application claims under 35 U.S.C. § 119(a) the benefit of priority to Korean Patent Application No. 10-2016-0064577 filed on May 26, 2016, the entire contents of which are incorporated herein by reference.

BACKGROUND

(a) Technical Field

The present disclosure relates to a system and method of controlling an engine for vehicle interior heating, and more particularly, to a system and method of controlling an engine for vehicle interior heating which improves fuel efficiency by adjusting engine-on time for vehicle interior heating based on the engagement time of an engine clutch depending on a driving pattern.

(b) Background Art

A hybrid vehicle is a type of environmentally friendly vehicle that utilizes an engine and a motor as power sources and is equipped with a power transfer system for driving the vehicle. For a power transfer system including an engine clutch, engine power generated upon starting the engine is transferred to driving wheels by synchronizing the rotation of the engine side of the engine clutch with the rotation of the transmission side of the engine clutch. Typically, the engine is started when engine power is required based on a driver's demand.

Air conditioning control for the hybrid vehicle is classified into cooling control and heating control. In the air conditioning control method for the hybrid vehicle, there is a difference between the cooling control method and the heating control method. The cooling control for interior cooling is executed by an air conditioner, which is equipped with an electric compressor and utilizes a battery as an energy source. The heating control for interior heating is executed by utilizing heat from the engine as an energy source.

Interior heating is executed by heat exchange between the engine coolant heated by the heating control and outdoor air that passes through a heater core of an air-conditioning system and then flows into the vehicle. In such a heating control, the engine state is switched into an on state from an off state to satisfy the requirements for the desired temperature of the vehicle interior irrespective of the state of charge of the battery or the driving pattern of the vehicle. However, in a hybrid vehicle, the engine is turned on or off based on heating control for interior heating and is also turned on or off based on the driving state of the vehicle, such as acceleration, constant speed, deceleration, stopping, etc.

Since the engine on/off control for vehicle driving and the engine on/off control for heating control are performed separately, the number of engine-on/off operations is increased, which causes substantial deterioration in fuel efficiency when driving the vehicle in cold weather, during which heating control is performed frequently.

SUMMARY

The present invention provides a system and method of controlling an engine for vehicle interior heating, capable of improving fuel efficiency by adjusting engine-on time for vehicle interior heating in consideration of the engagement time of an engine clutch depending on a driving pattern.

In one aspect, the present invention provides a method of controlling an engine for vehicle interior heating that may include first engine control when the engine is not in an engine-on state for vehicle driving, to perform heating control for interior heating at a predetermined range of a reference coolant temperature, and second engine control when the engine is in an engine-on state for vehicle driving, to increase an engine-on time for vehicle driving by setting a minimum value of the range of the reference coolant temperature to a lower value than an original value and setting a maximum value of the range of the reference coolant temperature to a higher value than the original value and to determine a point of time of engine-off operation based on a real-time lock up time and an average lock up time of an engine clutch for vehicle driving.

In an exemplary embodiment, the first engine control may include, under a condition that the reference coolant temperature is in a range from A to B (A<B), when "A≤current coolant temperature" is satisfied, maintaining an original state of the engine, and when "current coolant temperature<A" is satisfied, turning on the engine and maintaining the engine-on state until "B≤current coolant temperature" is satisfied. In addition, the second engine control may include, under a condition that the reference coolant temperature is in a range from A to B (A<B), when "(A−α)≤current coolant temperature" is satisfied, maintaining an original state of the engine, and when "current coolant temperature<(A−α)" is satisfied, maintaining the engine in an on state, and maintaining the engine-on state until "(B+β)≤current coolant temperature" is satisfied, in which α is a value to be subtracted from the minimum value of the reference coolant temperature, and β is a value to be added to the maximum value of the range of the reference coolant temperature.

The second engine control may further include, when the real-time lock up time is greater than or equal to the average lock up time, the engine-on state for heating control may be maintained for a predetermined reference time or longer while the vehicle is running by engine-on for vehicle driving and when "(A−α)≤current coolant temperature" is satisfied, turning off the engine; when the real-time lock up time is less than the average lock up time, the engine-on state for heating control may be maintained for the predetermined reference time or longer while the vehicle is running by engine-on for vehicle driving and when "(A−α)≤current coolant temperature" is satisfied, delaying an operation of turning off the engine by a predetermined additional engine-on time for additional heating control; and when "(A−α)≤current coolant temperature" is satisfied upon vehicle stop, turning off the engine. In addition, the second engine control may include, upon determining that the condition "(A−α)≤current coolant temperature" is satisfied while the vehicle is in a stopped state, turning off the engine.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
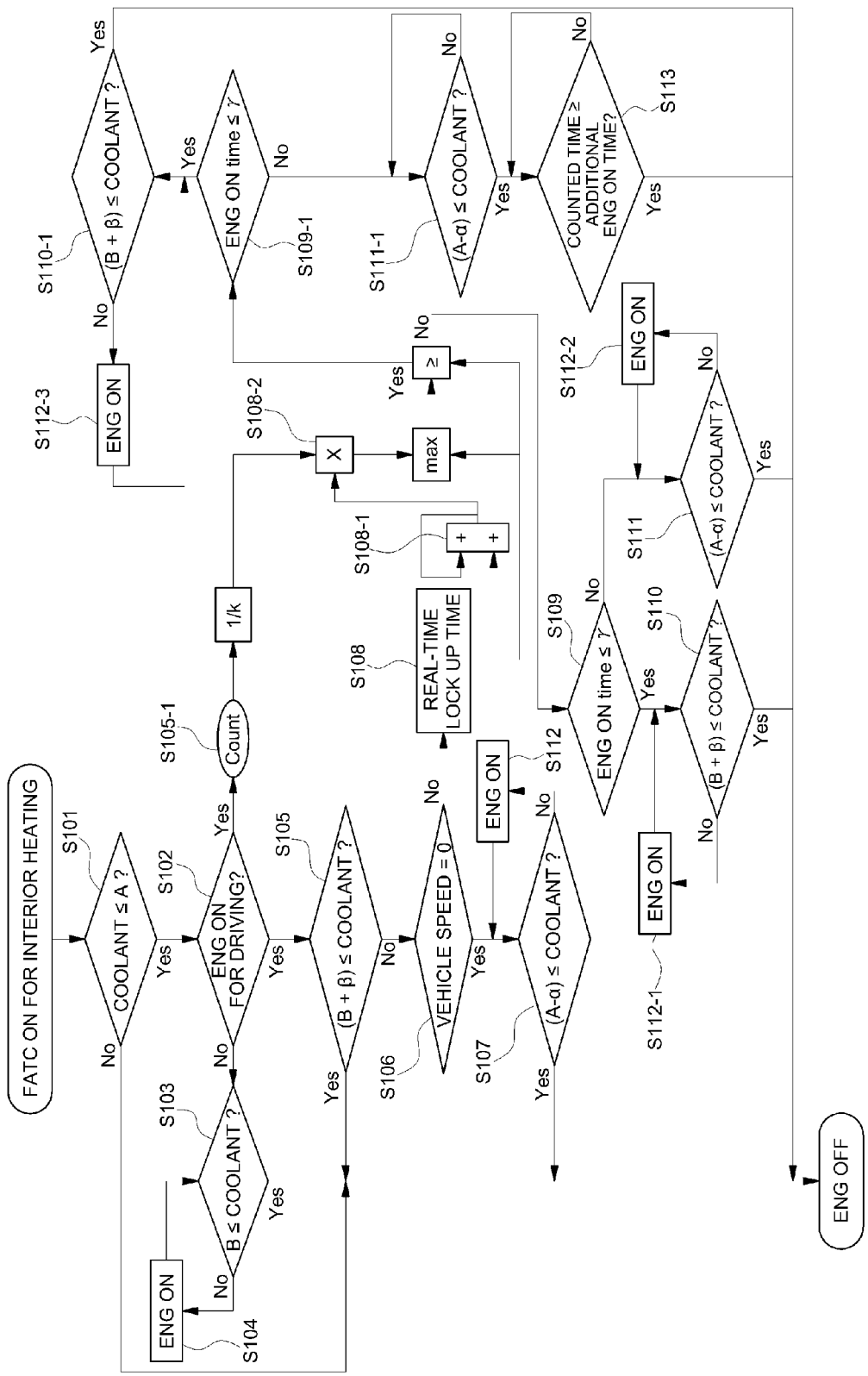
FIG. 1 is a flowchart illustrating a method of controlling an engine for vehicle interior heating according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The present invention provides a method of controlling an engine for vehicle interior heating, in which engine-on time for heating control may be adjusted while a vehicle is being driven in consideration of the engagement time of an engine clutch depending on a driving pattern to minimize the number of engine-on operations for heating control, specifically the number of engine idling-on operations, to more efficiently control the state of charge (SOC) of the battery and to reduce unnecessary fuel consumption for engine starting and interior heating.

According to the prior art related to the engine control method for vehicle interior heating, which is disclosed in Korean Patent Registration No. 10-1592712, filed by the present applicant, since engine-on operation for heating control is adjusted merely based on time, in the driving section in which acceleration and deceleration are frequently repeated without stoppage of the vehicle, engine-on/off operations occur irrespective of engine efficiency. Further, since engine-on operation for vehicle driving and engine-on operation for heating control occur additionally even after the engine-on operation for heating control, the engine-on/off operations are performed inefficiently. Therefore, fuel efficiency when driving the vehicle in cold weather, during which heating control is frequently performed, deteriorates.

On the contrary to the prior art, the present invention has an effect of improving fuel efficiency by adjusting engine-on time for vehicle interior heating in consideration of the engagement time of an engine clutch depending on a driving pattern. According to the present invention, when the engine is not in an engine-on state for vehicle driving (start), heating control for vehicle interior heating may be performed at a predetermined range of a reference coolant temperature, varying based on car type. When the engine is in an engine-on state for vehicle driving, a lower limit value (minimum value) of the range of the reference coolant temperature may be set to a lower value than an original value, and an upper limit value (maximum value) of the range of the reference coolant temperature may be set to a higher value than the original value, thereby increasing engine-on time for vehicle driving and increasing the coolant temperature at the same time. In particular, the lower limit value of the range of the reference coolant temperature may be set to a lower value than the original value by subtracting a predetermined value α from the lower limit value, and the upper limit value of the range of the reference coolant temperature may be set to a higher value than the original value by adding a predetermined value β to the upper limit value.

In addition, when the engine is in an engine-on state for vehicle driving, the point of time of engine-off operation may be determined based on a real-time lock up time and an average lock up time of an engine clutch, which is engaged for vehicle driving, and the engine-on state may be maintained until the determined point of time of engine-off operation is reached, thereby increasing the coolant temperature.

Hereinafter, a method of controlling an engine for vehicle interior heating according to the present invention will be described in more detail with reference to FIG. 1. FIG. 1 is a flowchart illustrating the method of controlling an engine for vehicle interior heating according to the present invention. The method described herein below may be executed by a controller having a processor and a memory.

First, when a full automatic temperature control (FATC) switch is turned on for vehicle interior heating, the controller may be configured to determine whether a current coolant temperature is less than or equal to "A" (minimum value) (that is, "current coolant temperature≤A") under the condition that a predetermined reference coolant temperature is in the range from "A" (minimum value) to "B" (maximum value) (e.g., "A<B") (S101).

When the condition "current coolant temperature≤A" is satisfied, one of the first engine control and the second engine control may be performed to heat control for interior heating. Accordingly, the controller may be configured to determine whether the engine is in an engine-on state for vehicle driving (e.g., the state in which the driving mode has been converted into a hybrid electric vehicle (HEV) mode from an electric vehicle (EV) mode) (S102). When the engine is not in an engine-on state for vehicle driving, the first engine control may be performed.

In other words, under the condition that a predetermined reference coolant temperature is in the range from "A" (minimum value) to "B" (maximum value) (e.g., "A<B"), when the condition "A≤current coolant temperature" is satisfied, the original state of the engine may be maintained, and when the condition "current coolant temperature<A" is satisfied, the engine may be turned on and the engine-on state may be maintained until the condition "B≤current coolant temperature" is satisfied (S104). After determining whether the condition "B≤current coolant temperature" is satisfied (S103), when the condition "B≤current coolant temperature" is not satisfied, the engine may be turned on and the engine-on state may be maintained until the condition "B≤current coolant temperature" is satisfied (S104), and the engine may be turned off when the condition "B≤current coolant temperature" is satisfied.

Furthermore, when the engine is in an engine-on state for vehicle driving (start), the second engine control may be performed. Under the condition that a predetermined reference coolant temperature is in the range from "A" (minimum value) to "B" (maximum value) (that is, "A<B"), the controller may be configured to determine whether the condition "(B+β)≤current coolant temperature" is satisfied (S105). When the condition "(B+β)≤current coolant temperature" is satisfied, the engine may be turned off, and otherwise, the second engine control may be performed. The number of engine-on operations for vehicle driving after the FATC switch is turned on may be detected or counted (S105-1).

After the second engine control is started, when the condition "(A−α)≤current coolant temperature" is satisfied under the condition that a predetermined reference coolant temperature is in the range from "A" (minimum value) to "B" (maximum value) (e.g., "A<B"), the original state of the engine (e.g., the engine-on state for vehicle driving or engine-off state) may be maintained. In particular, α is a predetermined value to be subtracted from the minimum value of the range of the reference coolant temperature, and β is a predetermined value to be added to the maximum value of the range of the reference coolant temperature.

After the second engine control is started, the controller may be configured to determine whether the vehicle is in a stopped state (vehicle speed=0) (S106), and when the vehicle is in a stopped state, the controller may be configured to determine whether the condition "(A−α)≤current coolant temperature" is satisfied (S107). When the condition "(A−α)≤current coolant temperature" is satisfied, the current coolant temperature is suitable for interior heating, and therefore the engine may be turned off. When the condition "(A−α)≤current coolant temperature" is not satisfied, the engine-on state may be maintained (S112).

Further, after the second engine control is started, when the vehicle is not in a stopped state, the engine-on state may be maintained until the condition "(B+β)≤current coolant temperature" is satisfied. Accordingly, the controller may be configured to determine whether the condition "(B+β)≤current coolant temperature" is satisfied (S110). When the condition "(B+β)≤current coolant temperature" is satisfied, the engine may be turned off, and otherwise, the engine-on state may be maintained until the condition "(B+β)≤current coolant temperature" is satisfied (S112-1).

Figure 2:
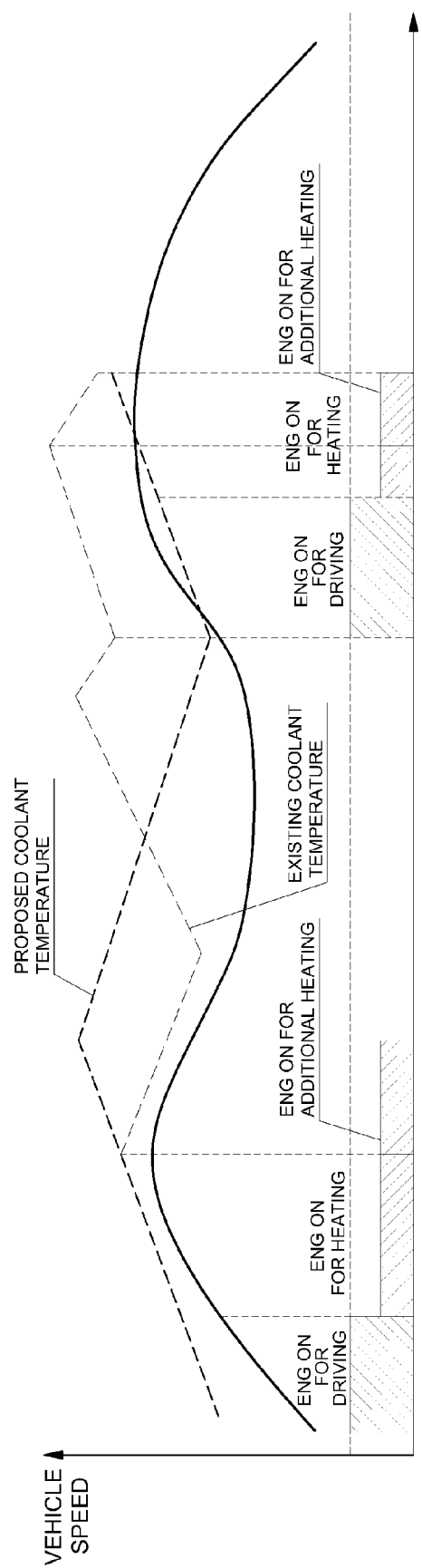
FIG. 2 is a conceptual view illustrating the method of controlling an engine for vehicle interior heating according to an exemplary embodiment of the present invention.

Particularly, referring to FIG. 2, illustrating an "ENG ON FOR HEATING" section, which corresponds to an engine-on state for heating control, when the condition "(B+β)≤current coolant temperature" is not satisfied in the engine-on state, the engine may be maintained in an on state until the condition "(B+β)≤current coolant temperature" is satisfied. In addition, after the second engine control is started, when the vehicle is not in a stopped state, the point of time of engine-off operation may be determined based on a real-time lock up time and an average lock up time of the engine clutch, which is engaged for vehicle driving, and the original state of the engine (e.g., the engine-on state or engine-off state) may be maintained before the point of time of engine-off operation is reached. Accordingly, a real-time lock up time, during which the engine clutch is maintained in an engaged state, may be detected by the controller using a type of sensor (S108), and an average lock up time of all engagement times of the engine clutch, which was engaged up to date (e.g., until the real-time lock up time is detected) every time the engine was turned on, may then be calculated.

To determine the average lock up time, the engagement times (e.g., lock up times) of the engine clutch, which has been engaged up to date (e.g., until the real-time lock up time is detected) every time the engine was turned on, may be summed (S108-1), and the summed value may be divided by the number of engine-on operations for vehicle driving, counted after the FATC switch was turned on (S108-2). When the real-time lock up time is greater than or equal to the average lock up time, the controller may be configured to determine whether the engine-on time for heating control is maintained for a predetermined reference time γ or longer while the vehicle is running by engine-on for vehicle driving (S109). When the engine-on time is longer than or equal to the reference time γ, the controller may be configured to determine whether the condition "(A−α)≤current coolant temperature" is satisfied (S111).

Additionally, when the condition "(A−α)≤current coolant temperature" is satisfied, the engine may be turned off, and otherwise, the engine-on state may be maintained until the condition "(A−α)≤current coolant temperature" is satisfied (S112-2). When the real-time lock up time is greater than or equal to the average lock up time, when the engine-on time (or engine-on) for heating control is maintained for the reference time γ or longer, the engine may be turned off based on the determination of whether the condition "(A−α)≤current coolant temperature" is satisfied to prevent the engine-on time from excessively increasing while the vehicle is being driven due to extension of the range of the reference coolant temperature, thereby preventing deterioration in fuel efficiency.

Meanwhile, when the real-time lock up time is less than the average lock up time, the controller may be configured to determine whether the engine-on time (or engine-on) for heating control is maintained for the reference time γ or longer while the vehicle is running by engine-on for vehicle driving (S109-1). When the engine-on time is greater than or equal to the reference time γ, the controller may be configured to determine whether the condition "(A−α)≤current coolant temperature" is satisfied (S111-1). When the condition "(A−α)≤current coolant temperature" is not satisfied, the engine-on state may be maintained until the condition "(A−α)≤current coolant temperature" is satisfied. Even though the point of time at which the condition "(A−α)≤current coolant temperature" is satisfied and the engine needs to be turned off has been reached, the point of time of engine-off operation may be delayed by an "additional engine-on time" for additional heating control (S113), thereby further prolonging the engine-on state. In other words, the engine may be prevented from being turned off immediately when the point of time at which the condition "(A−α)≤current coolant temperature" is satisfied and instead, a time count may be started, and the engine-on state may be further prolonged for the "additional engine-on time" for additional heating control.

In particular, referring to FIG. 2, illustrating an "ENG ON FOR ADDITIONAL HEATING" section, which corresponds to an engine-on state for heating control, even though the point of time at which the condition "(A−α)≤current coolant temperature" is satisfied and the engine needs to be turned off has been reached during the engine-on state, the engine may not be turned off immediately, rather, the engine-on state may be further prolonged for the "additional engine-on time" for additional heating control.

When the real-time lock up time is less than the average lock up time while the vehicle is running by engine-on for vehicle driving, when the engine-on time for heating control is maintained for the reference time γ or longer, the engine may not be turned off immediately at the point of time at which the condition "(A−α)≤current coolant temperature" is satisfied. Instead, the engine may be turned off when the additional engine-on time elapses to prevent an increase in the number of engine-on operations. In other words, when the engine is turned off immediately at the point of time at which the condition "(A−α)≤current coolant temperature" is satisfied for the purpose of prevention of deterioration in fuel efficiency, the engine-on time may be decreased while the vehicle is being driven, and thus additional engine-on operation for heating control may be required.

Figure 3:
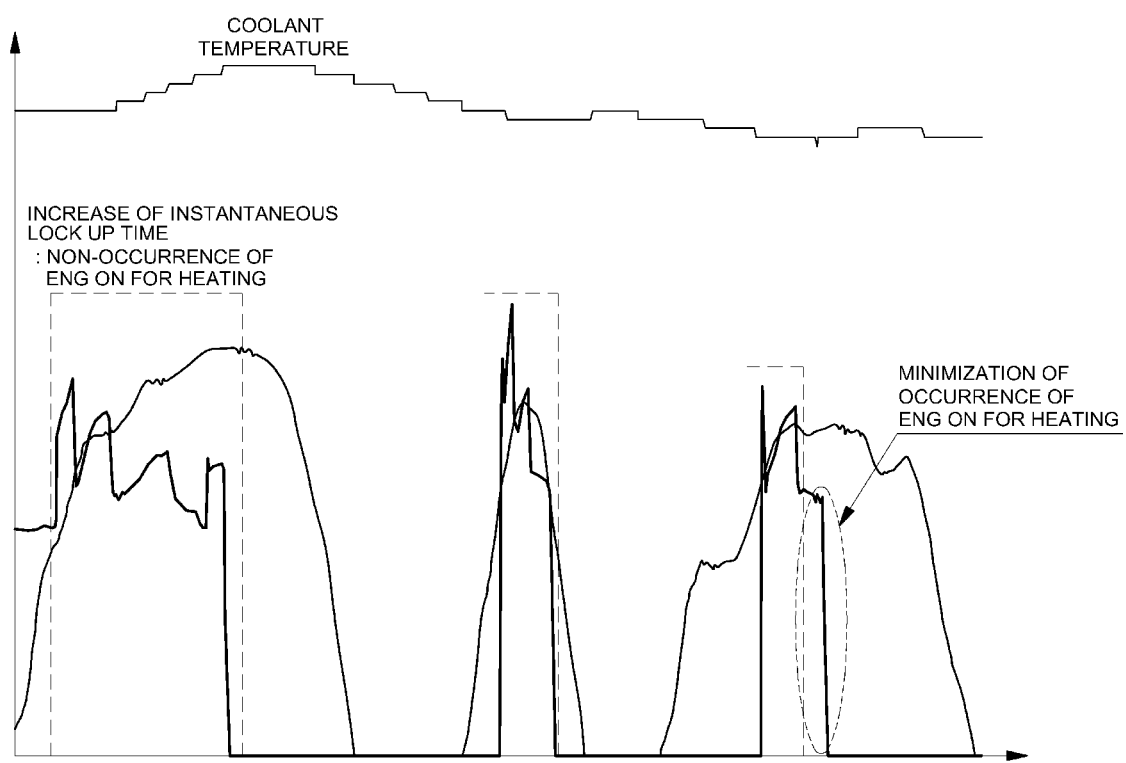
FIG. 3 is an exemplary view illustrating effects of the method of controlling an engine for vehicle interior heating according to an exemplary embodiment of the present invention.
Figure 4:
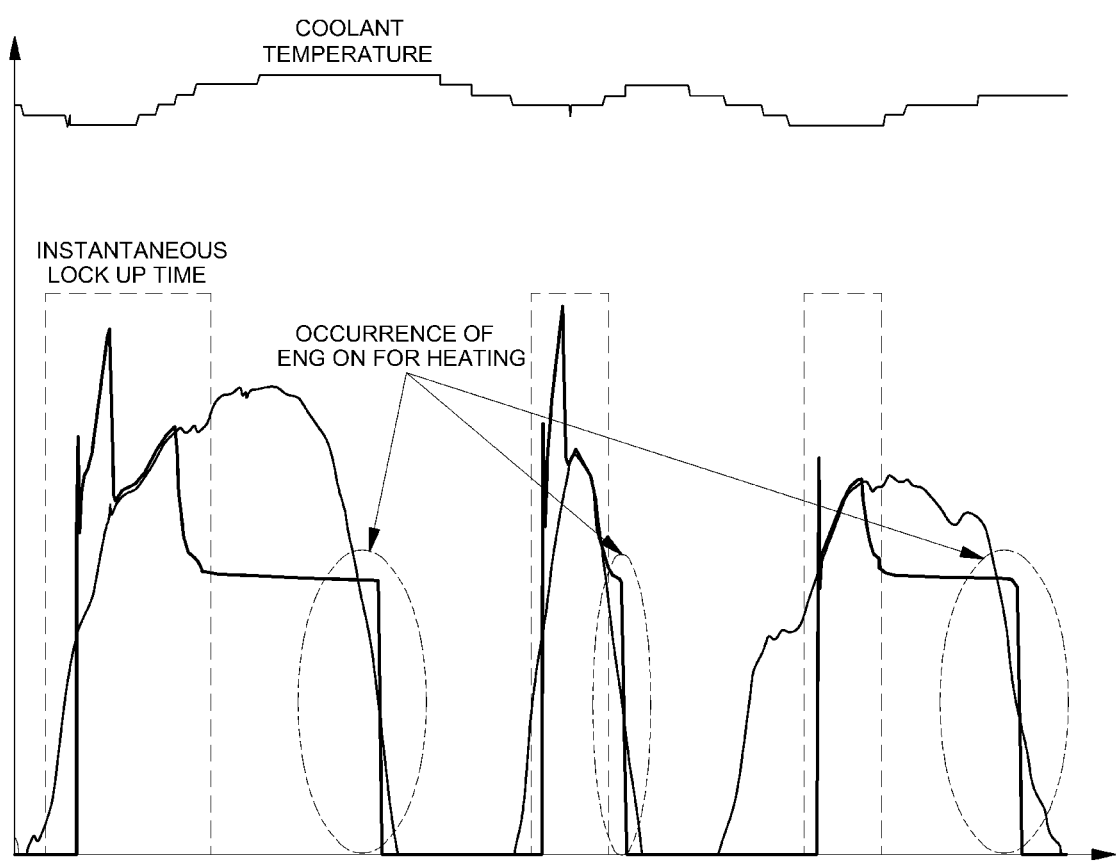
FIG. 4 is an exemplary view illustrating problems with a conventional method of controlling an engine for vehicle interior heating.

FIG. 3 is an exemplary view illustrating the effects of the method of controlling an engine for vehicle interior heating according to the present invention, and FIG. 4 is an exemplary view illustrating problems with a conventional method of controlling an engine for vehicle interior heating.

According to the conventional engine control method, irrespective of the engagement time (e.g., lock up time) of the engine clutch, engine-on operations for heating control occur in the vehicle driving section where acceleration and deceleration frequently occur, and thus, the number of engine-on operations for heating control is increased while the vehicle is being driven (refer to the portions indicated by the circular dotted lines in FIG. 4).

According to the engine control method of the present invention, in the same vehicle driving section, when the real-time (instantaneous) lock up time is greater than or equal to the average lock up time, since the engine-on time for vehicle driving is relatively long, engine-on operation for additional heating control does not occur, and the engine may be turned off. When the real-time (instantaneous) lock up time is less than the average lock up time, since the engine-on time for vehicle driving is relatively short, engine-on operation for additional heating control may occur subsequent to the engine-on operation for vehicle driving (refer to the portion indicated by the circular dotted line in FIG. 3).

As is apparent from the above description, the present invention provides a method of controlling an engine for vehicle interior heating, in which engine-on time for heating control may be adjusted while a vehicle is being driven in consideration of the engagement time of an engine clutch depending on a driving pattern to minimize the number of engine-on operations for heating control, specifically the number of engine idling-on operations, and to prevent the inefficient occurrence of engine-on/off operations, thereby improving fuel efficiency. In addition, it may be possible to efficiently control the state of charge (SOC) of the battery and to reduce unnecessary fuel consumption for engine starting and interior heating.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:
1. A method of controlling an engine for vehicle interior heating, comprising:
  performing, by a controller, a first engine control when the engine is not in an engine-on state for vehicle driving, to perform heating control for interior heating at a predetermined range of a reference coolant temperature; and
  performing, by the controller, a second engine control when the engine is in an engine-on state for vehicle driving, to prolong an engine-on time for vehicle driving by setting a minimum value of the range of the reference coolant temperature to a lower value than an original value and setting a maximum value of the range of the reference coolant temperature to a higher value than the original value, to determine a point of time of engine-off operation based on a real-time lock up time and an average lock up time of an engine clutch for vehicle driving, and to turn off the engine based on the determined point of time.

2. The method of claim 1, wherein the first engine control includes:
under a condition that the reference coolant temperature is in a range from A to B (A<B), when "A≤current coolant temperature" is satisfied, maintaining, by the controller, an original state of the engine; and
when "current coolant temperature<A" is satisfied, turning on, by the controller, the engine and maintaining the engine-on state until "B≤current coolant temperature" is satisfied.

3. The method of claim 1, wherein the second engine control includes:
under a condition that the reference coolant temperature is in a range from A to B (A<B), when "(A−α)≤current coolant temperature" is satisfied, maintaining, by the controller, an original state of the engine; and
when "current coolant temperature<(A−α)" is satisfied, maintaining, by the controller, the engine in an on state, and maintaining the engine-on state until "(B+β)≤current coolant temperature" is satisfied,
wherein α is a predetermined value to be subtracted from the minimum value of the range of the reference coolant temperature, and β is a predetermined value to be added to the maximum value of the range of the reference coolant temperature.

4. The method of claim 3, wherein the second engine control further includes:
when the real-time lock up time is greater than or equal to the average lock up time, the engine-on state for heating control is maintained for a predetermined reference time or longer while the vehicle is running by engine-on for vehicle driving and when "(A−α)≤current coolant temperature" is satisfied, turning off, by the controller, the engine; and
when the real-time lock up time is less than the average lock up time, the engine-on state for heating control is maintained for the predetermined reference time or longer while the vehicle is running by engine-on for vehicle driving and when "(A−α)≤current coolant temperature" is satisfied, delaying, by the controller, an operation of turning off the engine by additional engine-on time for additional heating control.

5. The method of claim 3, wherein the second engine control further includes:
when "(A−α)≤current coolant temperature" is satisfied while the vehicle is in a stopped state, turning off, by the controller, the engine.

6. A system of controlling an engine for vehicle interior heating, comprising:
a memory configured to store program instructions; and
a processor configured to execute the program instructions, the program instructions when executed configured to:
perform a first engine control when the engine is not in an engine-on state for vehicle driving, to perform heating control for interior heating at a predetermined range of a reference coolant temperature; and
perform a second engine control when the engine is in an engine-on state for vehicle driving, to prolong an engine-on time for vehicle driving by setting a minimum value of the range of the reference coolant temperature to a lower value than an original value and setting a maximum value of the range of the reference coolant temperature to a higher value than the original value, to determine a point of time of engine-off operation based on a real-time lock up time and an average lock up time of an engine clutch for vehicle driving, and to turn off the engine based on the determined point of time.

7. The system of claim 6, wherein the program instructions for the first engine control when executed are further configured to:
under a condition that the reference coolant temperature is in a range from A to B (A<B), when "A≤current coolant temperature" is satisfied maintain an original state of the engine; and
when "current coolant temperature<A" is satisfied turn on the engine and maintaining the engine-on state until "B≤current coolant temperature" is satisfied.

8. The system of claim 6, wherein the program instructions for the second engine control when executed are further configured to:
under a condition that the reference coolant temperature is in a range from A to B (A<B), when "(A−α)≤current coolant temperature" is satisfied maintain an original state of the engine; and
when "current coolant temperature<(A−α)" is satisfied maintain the engine in an on state, and maintain the engine-on state until "(B+β)≤current coolant temperature" is satisfied,
wherein α is a predetermined value to be subtracted from the minimum value of the range of the reference coolant temperature, and β is a predetermined value to be added to the maximum value of the range of the reference coolant temperature.

9. The system of claim 8, wherein the program instructions for the second engine control when executed are further configured to:
when the real-time lock up time is greater than or equal to the average lock up time, the engine-on state for heating control is maintained for a predetermined reference time or longer while the vehicle is running by engine-on for vehicle driving and when "(A−α)≤current coolant temperature" is satisfied turn off the engine; and
when the real-time lock up time is less than the average lock up time, the engine-on state for heating control is maintained for the predetermined reference time or longer while the vehicle is running by engine-on for vehicle driving and when "(A−α)≤current coolant temperature" is satisfied, delay an operation of turning off the engine by additional engine-on time for additional heating control.

10. The system of claim 8, wherein the program instructions for the second engine control when executed are further configured to:
when "(A−α)≤current coolant temperature" is satisfied while the vehicle is in a stopped state turn off by the controller, the engine.

* * * * *